E. L. BERGSTRESSER.
Horse Rake.
No. 36,268.
Patented Aug. 26, 1862.
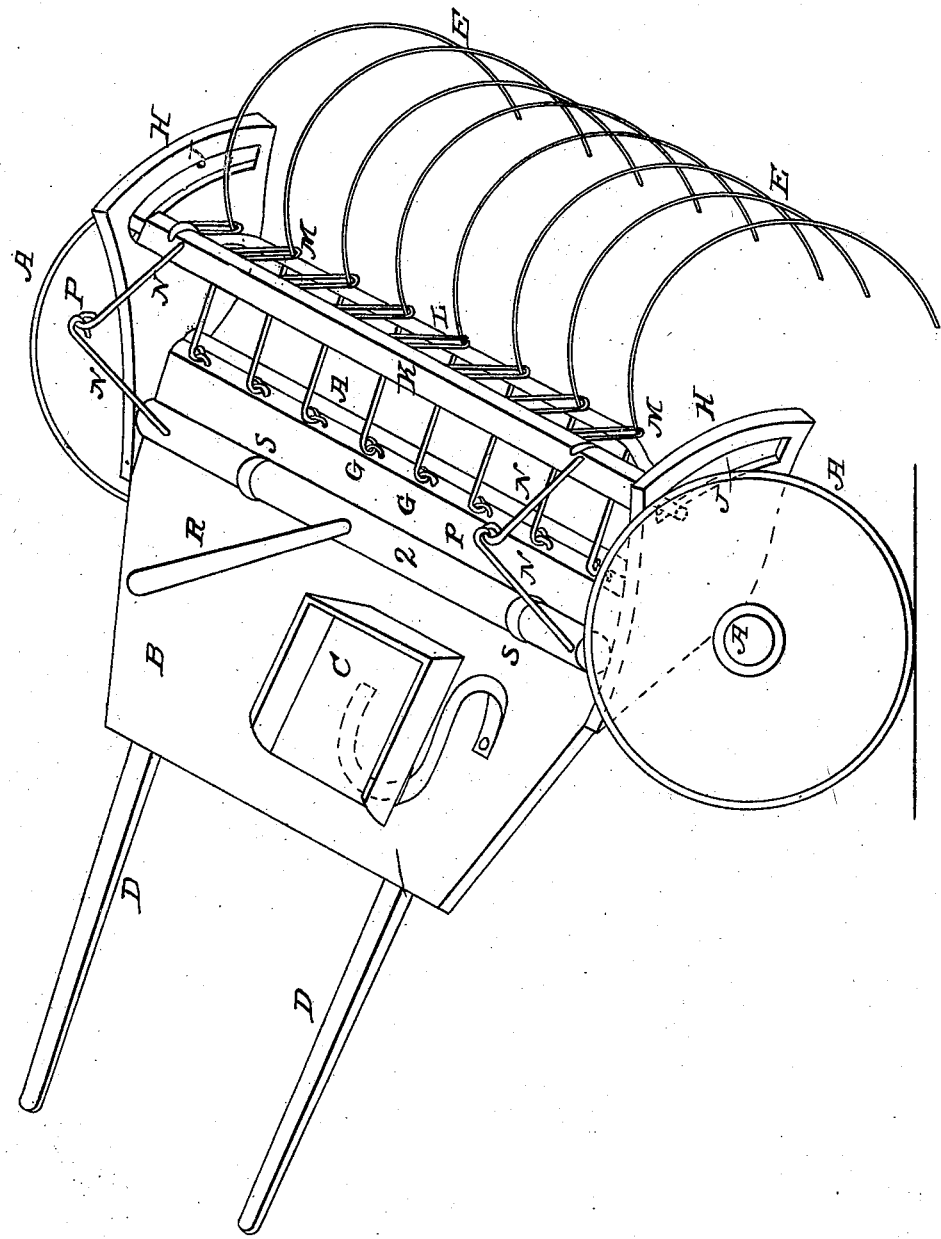

UNITED STATES PATENT OFFICE.

EDWIN L. BERGSTRESSER, OF BERRYSBURG, PENNSYLVANIA.

IMPROVEMENT IN HORSE-RAKES.

Specification forming part of Letters Patent No. 36,268, dated August 26, 1862.

*To all whom it may concern:*

Be it known that I, EDWIN S. BERGSTRESSER, of Berrysburg, Dauphin county, and State of Pennsylvania, have invented new and useful Improvements in Horse-Rakes; and I do hereby declare that the following is a full and exact description thereof, reference being had to the accompanying drawing, and to the letters of reference marked thereon, making a part of this specification.

The nature of my invention consists in the arrangement and combination of two curved sides projecting back of the carriage axle, each having a curved slot or opening, in which the ends of a vibrating cross-bar operate up and down, the cross-bar being attached to a roller on the platform of the machine by connecting-rods, and the roller is operated half round by moving an upright lever forward or backward, which operates the cross-bar to raise and lower the teeth or rake.

To enable others skilled in the art to make and use my invention, I will proceed to describe its construction and operation.

A represents the carriage wheels and axle, B the platform, and C the driver's seat, D the shafts.

E E represent the ordinary curved steel teeth, which are attached to the rear side of platform B by a common hook and eye, G.

H H are the projecting sides, attached to the sides of platform B immediately above the carriage-axle, extending back and curving upward, and wider at their outer ends. They are intended to be made of wood or iron, about four feet in length and about three feet in width at their outer ends. At the outer end of each is a curved opening or slot, J, in which the ends of a horizontal cross-bar, K, operate up and down in a curve. Underneath this cross-bar K is a long flat steel spring, L, fastened to each end of bar K to add elasticity to the pressure of the teeth. There are also long eyes M, of strong wire, fastened to the lower side of bar K, extending downward about six inches, in which the teeth work up and down, and are raised and supported in their proper positions. Connecting-rods N, of strong wire or rod-iron, hooked together in a joint, P, in the center, are fastened firmly, one end to the end of cross-bar K and the other end to the top side of roller Q. There are two of these jointed connecting-rods, one on each side of the machine, so as to raise and lower the cross-bar K and teeth more regularly and easily than by the usual devices of raising and lowering the teeth by a center draft.

R represents an upright lever, (which is operated by the right hand of the driver,) which is fastened permanently to the center of roller Q. The roller rests upon the platform B, across the machine parallel with the carriage-axle, and is held to the platform by two round clips, S, in which the roller revolves. As the driver presses the lever R forward the roller revolves forward about one-half round, drawing forward the connecting-rods N, thus raising the bar K and the teeth, which drop the hay or grain. When the driver lets go the lever R the cross-bar K falls in its slot J and drops the teeth by their own weight to the ground, the teeth again commence raking up the grain or hay.

The advantage is that while other rakes are operated by a short leverage or draft in the center, by which the teeth are raised above and near to the carriage-axle, this invention raises the teeth half the length of the teeth farther back from the axle, and thus works easier and better.

What I claim as my invention, and desire to secure by Letters Patent, is—

The construction and arrangement of the slotted sides H H, in combination with the vibrating cross-bar K and connecting-rods N, as arranged with the roller Q, for the purpose of raising the teeth with greater regularity and facility, as herein described.

EDWIN L. BERGSTRESSER.

Witnesses:
J. FRANKLIN REIGART,
T. I. SMULL.